(12) United States Patent
Ho et al.

(10) Patent No.: US 6,552,508 B1
(45) Date of Patent: Apr. 22, 2003

(54) APPARATUS AND METHOD FOR OPTIMALLY CONTROLLING FLUX IN AN AC MOTOR

(75) Inventors: Eddy Ying Yin Ho, Roanoke, VA (US); Anthony Michael Klodowski, Hardy, VA (US)

(73) Assignee: General Electric Co., Schenectady, NY (US)

( * ) Notice: Subject to any disclaimer, the term of this patent is extended or adjusted under 35 U.S.C. 154(b) by 0 days.

(21) Appl. No.: 09/570,949

(22) Filed: May 15, 2000

(51) Int. Cl.[7] .............................................. H02P 3/18
(52) U.S. Cl. ...................... 318/727; 318/798; 318/800; 318/802; 318/804; 318/805; 318/808; 318/810; 318/811; 318/813
(58) Field of Search ................................ 318/727, 798, 318/800, 802, 804, 805, 808, 810, 811, 813

(56) References Cited

U.S. PATENT DOCUMENTS

| | | | |
|---|---|---|---|
| 4,885,518 A | * 12/1989 | Schauder | .................... 318/798 |
| 5,172,041 A | 12/1992 | Bavard et al. | |
| 5,194,797 A | 3/1993 | Kahkipuro | |
| 5,668,459 A | * 9/1997 | Kim | ............................ 318/798 |
| 5,739,664 A | * 4/1998 | Deng et al. | .................. 318/808 |
| 5,814,967 A | * 9/1998 | Garces et al. | ................ 318/807 |
| 6,069,467 A | * 5/2000 | Jansen | ......................... 318/802 |
| 6,137,258 A | * 10/2000 | Jansen | ......................... 318/802 |
| 6,321,606 B1 | * 11/2001 | Ishii et al. | ............. 73/862.193 |
| 6,335,609 B1 | * 1/2002 | Amey et al. | ................. 318/811 |

OTHER PUBLICATIONS

PCT–International Search Report, date Oct. 26, 2001, for Application No. PCT/US01/14762, filed May 8, 2001.

* cited by examiner

Primary Examiner—Robert E. Nappi
Assistant Examiner—Tyrone Smith
(74) Attorney, Agent, or Firm—Karl Vick; Kevin Duncan; Hunton & Williams

(57) ABSTRACT

A method and apparatus for controlling flux in an induction motor. During initial start of an induction motor drive the motor flux has to be charged up. The method provides time optimal flux forcing under limited inverter ampere capability. Command stator flux and current are generated and coordinated through a motor flux model. Charging of the motor flux and flux current are accelerated up to nominal operating values in coordinated manner.

33 Claims, 3 Drawing Sheets

APPARATUS AND METHOD FOR OPTIMALLY CONTROLLING FLUX IN AN AC MOTOR

BACKGROUND OF THE INVENTION

The invention relates to a method and apparatus for controlling flux in an alternating current (AC) motor and, specifically, to a method and apparatus for accelerating flux to a nominal operating value in a coordinated manner without the need for flux feedback from the motor.

Control of an asynchronous AC motor is often achieved by directly or indirectly controlling motor flux. Conventionally, flux control requires determining the value of flux by measuring, for example, stator voltage and current and then deducing the motor flux from the measured voltage and current in combination with characteristics of the motor. For example, U.S. Pat. No. 5,172,041 to Bavard et al. discloses a method for asynchronous motor control using a closed-loop variation of magnetic induction flux as a function of a desired value. The motor flux is determined by detecting the motor voltage and the motor current and determining flux value by using the measured values in a motor operating equation.

U.S. Pat. No. 5,194,797 to Kahkipuro discloses a method for regulation of the stator flux and torque of an asynchronous motor using vector control. The absolute value of the stator flux is regulated by the real part of the stator voltage vector and the torque is regulated by the stator frequency. By adjusting the imaginary part of the stator voltage vector, the calculation coordinates are held in a position which allows the rotor flux to remain close to the real axis. The value of the torque and the absolute value of the stator flux are obtained by using measured parameters in a motor equation that is characteristic of the operation of the motor.

BRIEF SUMMARY OF THE INVENTION

A first aspect of the invention is a preflux forcing controller for an asynchronous, alternating current (AC) induction motor drive system comprising means for generating a flux reference value, means for generating a flux boosting value, means for generating a preflux current value, means for processing the flux reference value, the flux boosting value, and the preflux current value to determine an output signal, and means for providing at least one command signal to the motor based on the output signal.

A second aspect of the invention is a method of forcing flux in an asynchronous, alternating current (AC) induction motor drive system comprising the steps of generating a flux reference value, generating a flux boosting value, generating a preflux current value, processing the flux reference value, the flux boosting value, and the preflux current value to determine an output signal, and providing at least one command signal to the motor based on the output signal.

A third aspect of the invention is a preflux forcing controller for an asynchronous, alternating current (AC) induction motor drive system comprising a command flux generator configured to generate a flux reference value, a flux boost generator configured to generate a flux boosting value, a preflux current generator configured to generate a preflux current value, processing circuitry configured to process the flux reference value, the flux boosting value, and the preflux current value to determine an output signal, and a current regulator and voltage feedforward model of a motor drive configured to provide voltage commands based on the output signal.

A fourth aspect of the invention is a motor drive system for an asynchronous, alternating current (AC) induction motor comprising a command flux generator configured to generate a flux reference value, a flux boost generator configured to generate a flux boosting value, a preflux current generator configured to generate a preflux current value, processing circuitry configured to process the flux reference value, the flux boosting value, and the preflux current value to determine an output signal, a current regulator and voltage feedforward model of a motor drive configured to provide voltage commands based on the output signal, a DC bus, a voltage regulation and DC bus compensation module coupled to an output of said flux current model module and configured to generate a voltage signal and a phase angle signal, a vector rotate and pulse width modulation module coupled to an output of said voltage regulation and DC bus compensation module and configured to generate switching signals based on the voltage signal and the phase angle signal an inverter having bridges disposed across said DC bus and being coupled to said vector rotate and pulse width modulation module to generate a voltage signal intended to induce a desired current in an AC induction motor based on the switching signals, and a motor coupled to an output of said inverter.

BRIEF DESCRIPTION OF THE DRAWINGS

The invention is described through a preferred embodiment and the attached drawing in which.

DETAILED DESCRIPTION OF THE INVENTION

Figure 1:
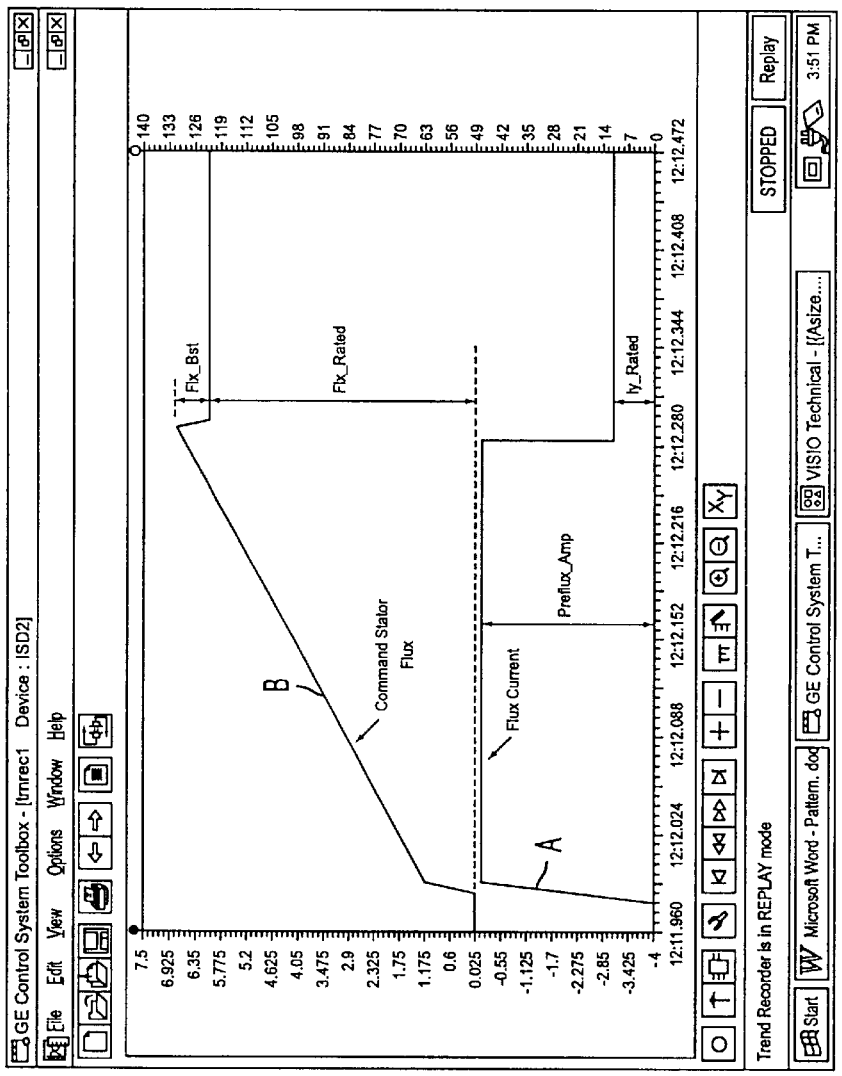
FIG. 1 is a graph of motor flux current and command stator flux versus time.

In the preferred embodiment, FIG. 1, is a graph of a command stator flux signal and the flux current of an AC induction motor drive system in accordance with a flux forcing procedure of the preferred embodiment of the invention. The flux current value (curve A is shown to remain substantially constant between 12:11.960 and 12:12.280 at a level of approximately 47 amps, as indicated by the axis on the right of FIG. 1. During the same time period the command stator flux value expressed as volts/hz on the left axis (curve B), input into the motor model as described in detail below, continually increases until the command stator flux value reaches a value of the flux reference value plus a flux boosting value (determined in the manner set forth below) at time 12:12.280. At this time, the command stator flux value is reduced by the flux boosting value. Of course, the magnitudes of these values are merely examples of possible values which are determined based on characteristics of the motor and the desired operation thereof.

In other words, the motor flux and flux current are forced, i.e. accelerated, up to nominal operating values in a coordinated manner. This is accomplished by injecting the current pulse of curve A into the motor stator winding during a flux forcing procedure. To accomplish this, a command stator flux and command stator flux current are determined in the manner described below and are input into the motor model as illustrated in FIG. 2 which is a block diagram of a motor drive system in accordance with the preferred embodiment.

Figure 2:
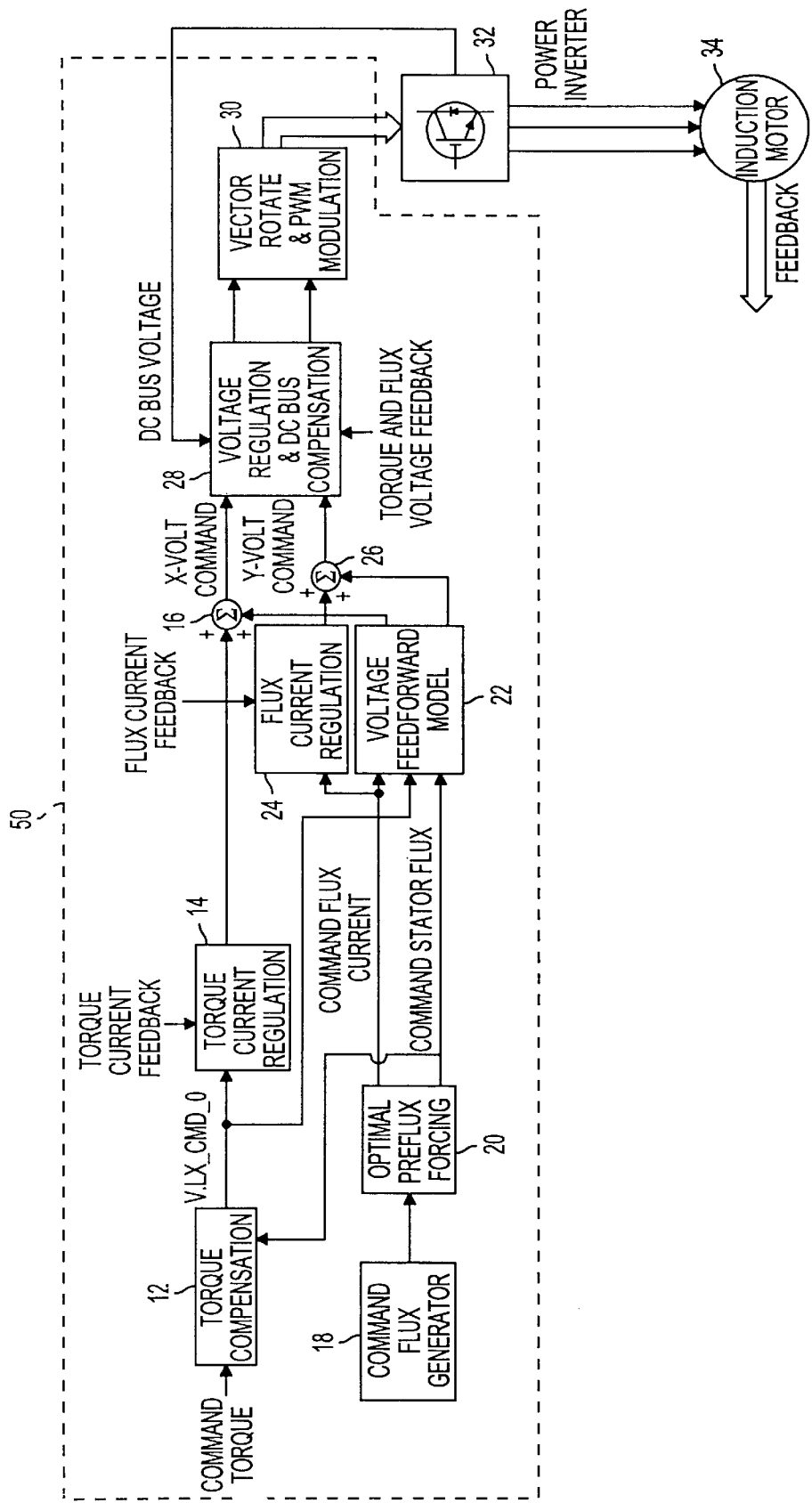
FIG. 2 is a block diagram of a motor drive system of the preferred embodiment of the invention.

As illustrated in FIG. 2, a command torque signal is input into torque compensation module 12 from an output of a speed regulator (not illustrated) or other device. Torque compensation module 12 determines the torque component of the stator current for the torque value of the command torque signal. The torque component stator current value is input into torque regulator 14 which maintains the torque stator current value at a constant value using a feedback loop. The constant torque stator current value for the desired torque is input into summing junction 16.

In response to a motor start signal, command flux generator 18 calculates a flux reference value based on a "volts per hertz" model in which the ratio of stator voltage to the electrical frequency is a constant below the rated speed of motor 34. The flux reference value is input into optimal preflux forcing controller 20 which calculates the command flux current and the command stator flux to control the flux forcing procedure as illustrated in FIG. 1. The internal operation of optimal preflux forcing controller 20 is described in greater detail below.

Optimal preflux forcing controller 20 dynamically outputs the command flux current (which indicates the flux component of the desired stator current) and command stator flux (which indicates the desired operating flux). These signals are inputted into voltage feedforward model 22 along with the torque component stator current value output from torque compensation module 12. Voltage feedforward model 22 includes the voltage equations of field-oriented motor based on stator flux command. Voltage feedforward model 22 outputs command voltage signals for the torque channel (x) command (which is input into summing junction 16) and the flux channel (y) command (which is input into summing junction 26). The torque channel signal is summed with the output of the torque channel regulator 14 and the flux channel voltage command is summed with the output of flux current regulator 24.

The output of summing junction 16 is the torque channel voltage command and the output of summing junction 26 is the flux channel voltage command. These vector commands are input into voltage regulation and DC bus compensation module 28 which generates a voltage signal and a phase angle signal in a known manner. The voltage and phase angle signals are transformed into switching signals by PWM module 30 and the switching signals are used to gate bridges in inverter module 32 disposed across a DC bus in a known manner. The switching signals cause PWM module 30 to generate voltage pulses that cause a sinusoidal current, or a reasonable facsimile thereof, to be generated in the stator winding of motor 34. With the exception of inverter module 32 and motor 34, all of the elements of FIG. 2 are implemented as preprogrammed firmware or software 50.

Figure 3:
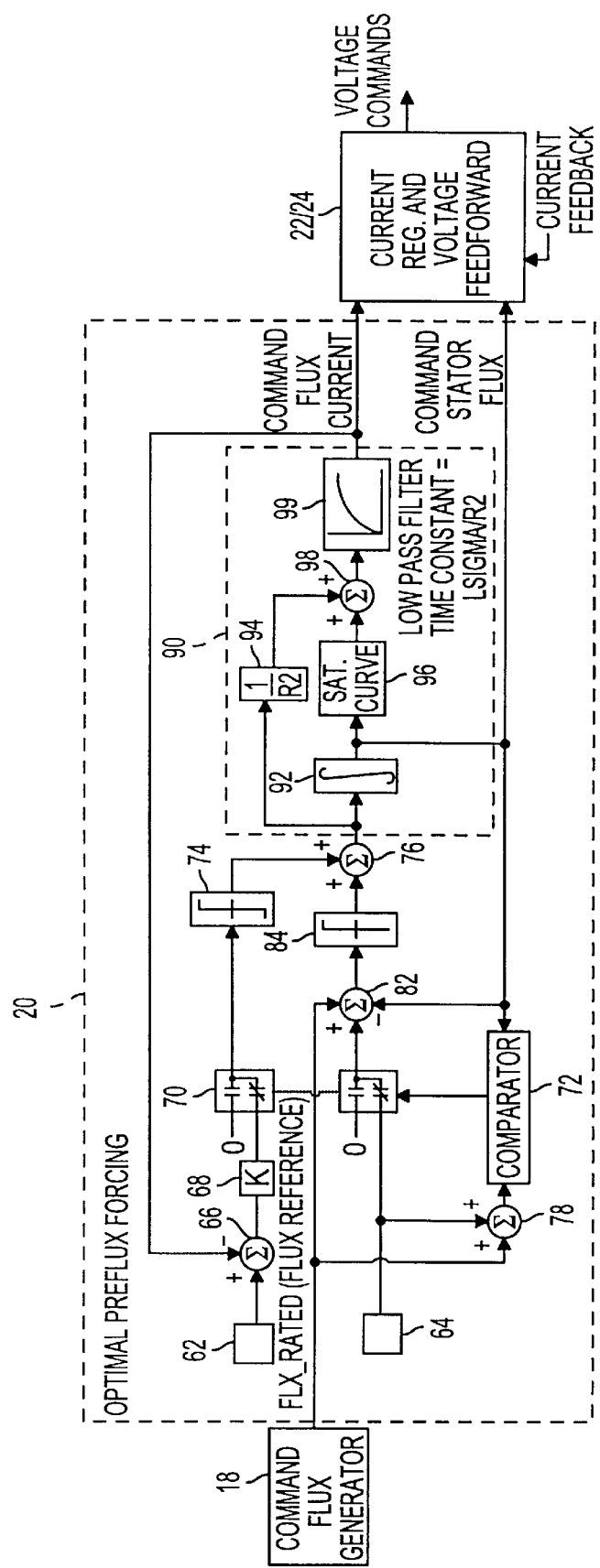
FIG. 3 is a logic diagram of the optimal preflux forcing controller of the preferred embodiment.

FIG. 3 illustrates optimal preflux forcing controller 20 of the preferred embodiment in detail. A motor start signal can be generated either locally at motor 34 or remotely on a control panel. Upon receipt of the start signal command, flux generator 18 will generate a flux reference value in the manner described above (see FIG. 1). Preflux current generator 62 calculates the maximum preflux current level and generates a preflux current value that represents the magnitude of the current pulse to be injected into the stator windings of motor 34 as illustrated in curve A of FIG. 1. Preflux current is defaulted to the rated motor nameplate value but can be configured differently to achieve faster preflux forcing with a higher current level Also, flux boost generator 64 generates a flux boosting value described in greater detail below. The value of the flux reference, preflux current, and the flux boosting value are each predetermined based on motor data of the motor being started. The, preflux current value is representative of a value, i.e. magnitude, of preflux current to be injected into the stator winding of motor 34 to be started. The preflux current injected into motor 34 will increase the stator flux and flux current of the motor to a predetermined value. Once the stator flux and flux current have reached a predetermined value, injection of the preflux current will be terminated. The preflux current is maintained substantially constant during injection by a command flux current value input into summing junction 66 as described below.

The output of summing junction 66 is multiplied by a design constant K in multiplier 68. The design constant is determined based on the design parameters of motor 34. The output of multiplier 68 is an injection signal which represents the voltage being developed within motor 34 for each ampere of current injected into the stator winding of motor 34. Switching device 70 receives a control signal from comparator 72 to selectively couple the output of multiplier 68 to limiter 74 for reasons which will become apparent below. If the injection signal is not received at limiter 74 and thus summing junction 76, there will no longer be a signal to inject current into the stator winding of motor 34. Limiter 74 limits the maximum voltage for current injection to avoid current overshoot during current acceleration.

The flux reference value from command flux generator 18 is received by summing junction 78 and is added to the flux boosting value output by flux boost generator 64. The flux boosting value is representative of the leakage flux of motor 34 and is used to compensate for flux losses during stator flux acceleration. The output of summing junction 78 is received by comparator 72 and is compared with a command stator flux signal generated by flux current model 90 described below. When the command stator flux signal is equal to the flux reference plus the flux boosting value, i.e. the output of summing junction 78, comparator 72 will activate switching junctions 70 and 80 to prevent the injection signal from being received by summing junction 76 and to eliminate the flux boosting value from being received by summing junction 82, i.e. to disable generation of the injection signal and the flux boosting value. The elimination of the flux boosting value at the proper time will establish the command stator flux value at the desired steady-state flux value of motor 34 while compensating for any leakage flux during acceleration of the stator flux.

There are two paths (one from limiter 74 and other from limiter 84) which contribute to the required flux forcing voltages (output of summing junction 76). The output of limiter 84 is the linear command stator flux ramping portion which controls the command stator flux to rise linearly with time. The output of limiter 74 is the acceleration command stator flux which accelerates the rate of change of command stator flux such that the current will rise to the desire injection level (as shown in FIG. 1 curve A) and be maintained until the command stator flux reaches Flx_Rated plus Flx_Bst. The output of summing junction 76 is input into flux current model 90 which represents a transfer function between the stator flux current and the stator flux of motor 34.

In flux current model 90 integrator 92 integrates the output summing junction 76 over time to obtain a signal representative of the stator flux during a stator flux acceleration procedure. The output of integrator 92 is input into comparator 72 and voltage feedforward model 22 as the above-noted command stator flux signal. The output of the summing junction 76 is also received by transient current component module 94 of current model 90. The output of the transient current component module 94 is a value in units of amperes and is received by current module summing junction 98. In particular, transient current component module 94 divides the voltage value signal input thereto by R2 which is the roter resistance or motor 34. The output of transient current component module 94 is representative of the transient current component of motor 34 during the stator flux acceleration procedure.

The output of integrator 92 is also received by the saturation curve module 96 of current model 90. The output of saturation curve module 96 is representative of the steady-state current component of motor 34 during the stator flux acceleration procedure. The output of saturation curve module 96 is also received by current model summing junction 98 which adds the transient current component value and the steady-state current component value and sends the result to low pass filter 99 which has a leakage time constant representing a flux model of motor 34. The resulting command flux current signal is input to current regulator 24 and voltage feedforward model 22 as noted above.

It can be seen that the flux acceleration procedure of the preferred embodiment injects a preflux current having a substantially constant magnitude, to the motor stator during flux forcing, i.e. acceleration. When the stator flux reaches the rated flux plus a flux boost amount, the preflux current is eliminated to step the stator flux to its rated value. This permits the motor to be charged up quickly and allows the flux forcing current to reach a nominal value quickly without exceeding the inverter current capability. The invention permits coordination of command flux and flux current to maintain a field oriented de-coupled drive system.

The preferred embodiment illustrates functional blocks. However, the various functions of the invention can be accomplished through analog logic devices, preprogrammed solid state devices, or in any other manner. Known feedback loops can be used to control torque and other operating values of the motor.

While the foregoing description includes many details and specificities, it is to be understood that these have been included for purposes of explanation only, and are not to be interpreted as limitations of the present invention. Many modifications to the embodiments described above can be made without departing from the spirit and scope of the invention, as is intended to be encompassed by the following claims and their legal equivalents.

What is claimed is:

1. A preflux forcing controller for an asynchronous, alternating current (AC) induction motor drive system comprising:
   means for generating a flux reference value;
   means for generating a flux boosting value;
   means for generating a preflux current value to perform a flux acceleration procedure;
   means for processing the flux reference value, the flux boosting value, and the preflux current value to determine an output signal; and
   means for providing at least one command signal to the motor based on the output signal; and
   wherein the means for processing generates a command stator flux, and wherein a command stator flux value is continually increased until the command stator flux value reaches a value substantially equal to the flux reference value plus the flux boosting value, at which time the command stator flux value is reduced by the flux boosting value.

2. The controller of claim 1, wherein the flux reference value is representative of a corrected steady-state flux value of the motor at or below rated speed.

3. The controller of claim 1, wherein the flux boosting value is representative of leakage flux of the motor at steady-state operating conditions.

4. The controller of claim 1, wherein the preflux current value is representative of an AC current value injected into a stator winding of the motor.

5. The controller of claim 4, wherein said means for processing comprises:
   means for generating an injection signal representative of the relationship between motor voltage current injected into a stator winding of the motor based on the preflux current value;
   means for generating a linear command stator flux based on the flux boosting value and the flux reference value; and
   means for summing the injection signal and the linear command stator flux to obtain a flux forcing voltage.

6. The controller of claim 5, wherein said means for processing further comprises flux current model means for generating a command flux current and the command stator flux, as the output signal, based on the flux forcing voltage.

7. The controller of claim 6, further comprising means for disabling said means for generating an injection signal and said means for generating a flux boosting value when the command stator flux signal is substantially equal to the sum of the flux reference value and the flux boosting value.

8. The controller of claim 7, wherein said means for providing comprises a current regulator and voltage feedforward model of a motor drive.

9. The controller of claim 8, further comprising:
   voltage regulation and DC bus compensation means for generating a voltage signal and a phase angle signal;
   vector rotate and pulse width modulation means for generating switching signals based on the voltage signal and the phase angle signal; and
   inverter means having bridges disposed across a DC bus and being responsive to the switching signals to generate a voltage signal intended to induce a desired current in an AC induction motor.

10. A method of forcing flux in an asynchronous, alternating current (AC) induction motor, drive system comprising the steps of:
    generating a flux reference value;
    generating a flux boosting value;
    generating a preflux current value to perform a flux acceleration procedure;
    processing the flux reference value, the flux boosting value, and the preflux current value to determine an output signal; and
    providing at least one command signal to the motor based on the output signal; and
    generating a command stator flux, and wherein a command stator flux value is continually increased until the command stator flux value reaches a value substantially equal to the flux reference value plus the flux boosting value, at which time the command stator flux value is reduced by the flux boosting value.

11. The method of claim 10, wherein the flux reference value is representative of a corrected steady-state flux value of the motor at or below rated speed.

12. The method of claim 10, wherein the flux boosting value is representative of leakage flux of the motor at steady-state operating conditions.

13. The method of claim 10, wherein the preflux current value is representative of an AC current value injected into a stator winding of the motor.

14. The method of claim 13, wherein said processing step comprises:
   generating an injection signal representative of the relationship between motor voltage current injected into a stator winding of the motor based on the preflux current value;
   generating a linear command stator flux based on the flux boosting value and the flux reference value; and
   summing the injection signal and the linear command stator flux to obtain a flux forcing voltage.

15. The method of claim 14, wherein said processing step comprises generating a command flux current and the command stator flux, as the output signal, based on the flux forcing voltage using a flux current model of a motor.

16. The method of claim 15, further comprising the step of discontinuing said step of generating an injection signal and said step of generating a flux boosting value when the command stator flux signal is substantially equal to the sum of the flux reference value and the flux boosting value.

17. The method of claim 16, wherein said providing step comprises inputting the command flux current into a current regulator and voltage feedforward model of a motor drive and generating voltage commands.

18. The method of claim 17, further comprising:
   generating a voltage signal and a phase angle signal with a voltage regulation and DC bus compensation module;
   generating switching signals based on the voltage signal and the phase angle signal with a vector rotate and pulse width modulation module; and
   generating a voltage signal intended to induce a desired current in an AC induction motor with an inverter having bridges disposed across a DC bus and being responsive to the switching signals.

19. A preflux forcing controller for an asynchronous, alternating current (AC) induction motor, drive system comprising:
   a command flux generator configured to generate a flux reference value;
   a flux boost generator configured to generate a flux boosting value;
   a preflux current generator configured to generate a preflux current value to perform a flux acceleration procedure;
   processing circuitry configured to process the flux reference value, the flux boosting value, and the preflux current value to determine an output signal; and
   a current regulator and voltage feedforward model of a motor drive configured to provide voltage commands based on the output signal; and
   wherein the processing circuitry generates a command stator flux, and wherein a command stator flux value is continually increased until the command stator flux value reaches a value substantially equal to the flux reference value plus the flux boosting value, at which time the command stator flux value is reduced by the flux boosting value.

20. The controller of claim 19, wherein the flux reference value is representative of a corrected steady-state flux value of the motor at or below rated speed.

21. The controller of claim 19, wherein the flux boosting value is representative of leakage flux of the motor at steady-state operating conditions.

22. The controller of claim 19, wherein the preflux current value is representative of an AC current value injected into a stator winding of the motor.

23. The controller of claim 22, wherein said processing circuitry comprises:
   a first summing device coupled to an output of said preflux current generator and said processing circuitry, and a multiplier coupled to an output of said first summing device, an output of said multiplier being an injection signal representative of the relationship between motor voltage current injected into a stator winding of the motor based on the preflux current value;
   a second summing device coupled to an output of said command flux generator and said flux boost generator, an output of said second summing device being a linear command stator flux; and
   a third summing device coupled to the output of said multiplier and the output of said second summing device, an output of said third summing device being a flux forcing voltage.

24. The controller of claim 23, wherein said processing circuitry further comprises a flux current model module coupled to the output of said third summing device and configured to generate a command flux current and the command stator flux based on the flux forcing voltage.

25. The controller of claim 24, further comprising a first switching device coupled to an output of said multiplier to disable the injection signal when the command stator flux signal is substantially equal to the sum of the flux reference value and the flux boosting value, and a second switching device coupled to an output of said flux boost generator to disable said flux boost value when the command stator flux signal is substantially equal to the sum of the flux reference value and the flux boosting value.

26. The controller of claim 25, further comprising:
   a voltage regulation and DC bus compensation module coupled to an output of said current model regulator and voltage feed forward and configured to generate a voltage signal and a phase angle signal;
   a vector rotate and pulse width modulation module coupled to an output of said voltage regulation and DC bus compensation module and configured to generate switching signals based on the voltage signal and the phase angle signal; and
   an inverter having bridges disposed across a DC bus and being coupled to said vector rotate and pulse width modulation module to generate a voltage signal intended to induce a desired current in an AC induction motor based on the switching signals.

27. A motor drive system for an asynchronous, alternating current (AC) induction motor, drive system comprising:
   a command flux generator configured to generate a flux reference value;
   a flux boost generator configured to generate a flux boosting value;
   a preflux current generator configured to generate a preflux current value so as to perform a flux acceleration procedure;
   processing circuitry configured to process the flux reference value, the flux boosting value, and the preflux current value to determine an output signal;
   a current regulator and voltage feedforward model of a motor drive configured to provide voltage commands based on the output signal;
   a DC bus;
   a voltage regulation and DC bus compensation module coupled to an output of said current regulator model and voltage feedforward and configured to generate a voltage signal and a phase angle signal;

a vector rotate and pulse width modulation module coupled to an output of said voltage regulation and DC bus compensation module and configured to generate switching signals based on the voltage signal and the phase angle signal; and an inverter having bridges disposed across said DC bus and being coupled to said vector rotate and pulse width modulation module to generate a voltage signal intended to induce a desired current in an AC induction motor based on the switching signals; and an AC motor coupled to an output of said inverter; and wherein the processing circuitry generates a command stator flux, and wherein a command stator flux value is continually increased until the command stator flux value reaches a value substantially equal to the flux reference value plus the flux boosting value, at which time the command stator flux value is reduced by the flux boosting value.

28. The system of claim 27, wherein the flux reference value is representative of a corrected steady-state flux value of said motor at or below rated speed.

29. The system of claim 27, wherein the flux boosting value is representative of leakage flux of the motor at steady-state operating conditions.

30. The system of claim 27, wherein the preflux current value is representative of an AC current value injected into a stator winding of said motor.

31. The system of claim 30, wherein said processing circuitry comprises:

a first summing device coupled to an output of said preflux current generator and said processing circuitry, and a multiplier coupled to an output of said first summing device, an output of said multiplier being an injection signal representative of the relationship between motor voltage current injected into a stator winding of the motor based on the preflux current value;

a second summing device coupled to an output of said command flux generator and said flux boost generator, an output of said second summing device being a linear command stator flux; and a third summing device coupled to the output of said multiplier and the output of said second summing device, an output of said third summing device being a flux forcing voltage.

32. The system of claim 31, wherein said processing circuitry further comprises a flux current model module coupled to the output of said third summing device and configured to generate a command flux current and the command stator flux based on the flux forcing voltage.

33. The system of claim 32, further comprising a first switching device coupled to an output of said multiplier to disable the injection signal when the command stator flux signal is substantially equal to the sum of the flux reference value and the flux boosting value, and a second switching device coupled to an output of said flux boost generator to disable said flux boost value when the command stator flux signal is substantially equal to the sum of the flux reference value and the flux boosting value.

* * * * *